United States Patent [19]

Mitsuhashi

[11] 3,927,951
[45] Dec. 23, 1975

[54] WATER TURBINE

[75] Inventor: Yoshiyasu Mitsuhashi, Yokohama, Japan

[73] Assignee: Tokyo Shibaura Denki Kabushiki Kaisha, Japan

[22] Filed: Aug. 27, 1974

[21] Appl. No.: 500,878

[30] Foreign Application Priority Data
Aug. 28, 1973  Japan ............................ 48-100793

[52] U.S. Cl. ............................ 415/110; 415/170 A
[51] Int. Cl.² ...................... F16J 15/50; F04D 9/00
[58] Field of Search ........ 415/1, 112, 109, 110, 111, 415/170 A

[56] References Cited
UNITED STATES PATENTS

| | | | |
|---|---|---|---|
| 3,237,563 | 1/1966 | Hartland | 415/1 |
| 3,237,564 | 1/1966 | Hartland | 415/1 |
| 3,237,565 | 1/1966 | Hartland | 415/1 |
| 3,238,534 | 1/1966 | Hartland | 415/1 |
| 3,724,966 | 4/1973 | Sproule | 415/110 |

FOREIGN PATENTS OR APPLICATIONS

| | | | |
|---|---|---|---|
| 839,964 | 6/1960 | United Kingdom | 415/110 |

*Primary Examiner*—Henry F. Raduazo
*Attorney, Agent, or Firm*—Stevens, Davis, Miller & Mosher

[57] ABSTRACT

In a water turbine for use in a pumping-up type hydroelectric power station wherein pressurized air is introduced into the turbine chamber when starting the turbine as a pump and then the air is discharged through an annular chamber about the turbine shaft, the annular chamber is divided into upper and lower sections. The air discharge pipe is connected to the upper section and water entering into the lower section is forced radially outwardly thereby preventing the water from interferring with free flow of discharged air.

4 Claims, 2 Drawing Figures

WATER TURBINE

BACKGROUND OF THE INVENTION

This invention relates to a water turbine utilized in a pumping-up type hydroelectric power generating station, and more particularly to apparatus for discharging air used to force down the water level when the turbine is started as a pump.

In a pumping-up type hydroelectric power station when the operation of the power station is switched from power generation to pumping-up water, the operation of the turbine is switched to pumping. At this time, it is usual to force down the water level in the runner chamber of the turbine by admitting thereinto pressurized air for the purpose of starting the runner under a light load. Then, the air in the runner chamber is gradually discharged by water to speed up the pump.

Heretofore apparatus as shown in FIG. 1 has been used wherein the air at the central portion of a runner 1 is discharged to the outside through a conduit 3 extending through the bottom portion of the turbine shaft 2, an annular chamber 6 defined by an inner flange 11 of the upper cover 5 of the water turbine and a packing gland 4 surrounding the main shaft 2, and through a discharge pipe 8 having an exit opening 7.

With this construction, however, when the discharge of the air is commenced, due to the centrifugal force created by the rotation of the runner 1, water firstly fills the peripheral portion of the runner chamber, then fills the space between the upper plate of the runner 1 and the upper cover 5, and finally enters into annular chamber 6, through a gap 10 between flange 11 and a bolt cover 12. For this reason, if the exit opening 7 is formed through the outer side wall of the chamber 6 or the inner flange of the upper cover 5, the opening 7 will be closed by the water thus preventing effective discharge of the air from the runner chamber.

SUMMARY OF THE INVENTION

It is an object of this invention to provide an improved water turbine capable of obviating the difficulty described above.

Another object of this invention is to provide an improved water turbine for use in a pumping-up hydroelectric power station which can eliminate the difficulty described above when the power station is operated for pumping-up water.

Still another object of this invention is to provide an improved water turbine provided with means for efficiently preventing water from interferring with free flow of the discharged air and having a simple construction and can readily be applied to existing installations.

Briefly stated, in accordance with this invention in a water turbine of the type wherein when the turbine is started to operate as a pump, pressurized air is introduced into the turbine chamber, and then the air therein is discharged through a conduit provided for the shaft of the turbine, through an annular chamber about the shaft and through a discharge pipe opening into the annular chamber, there is provided an annular member for dividing the annular chamber into two sections. The outer periphery of the annular member is secured to the outer side wall of the annular chamber while the inner periphery terminates a short distance from the outer periphery of the turbine shaft thereby forming an air passage therebetween. The air discharge pipe is opened into the upper section and water entering into the lower section which is communicated with the peripheral portion of the turbine chamber is forced radially outwardly by the centrifugal force created by the rotation of the shaft.

DESCRIPTION OF THE PREFERRED EMBODIMENT

Figure 1:
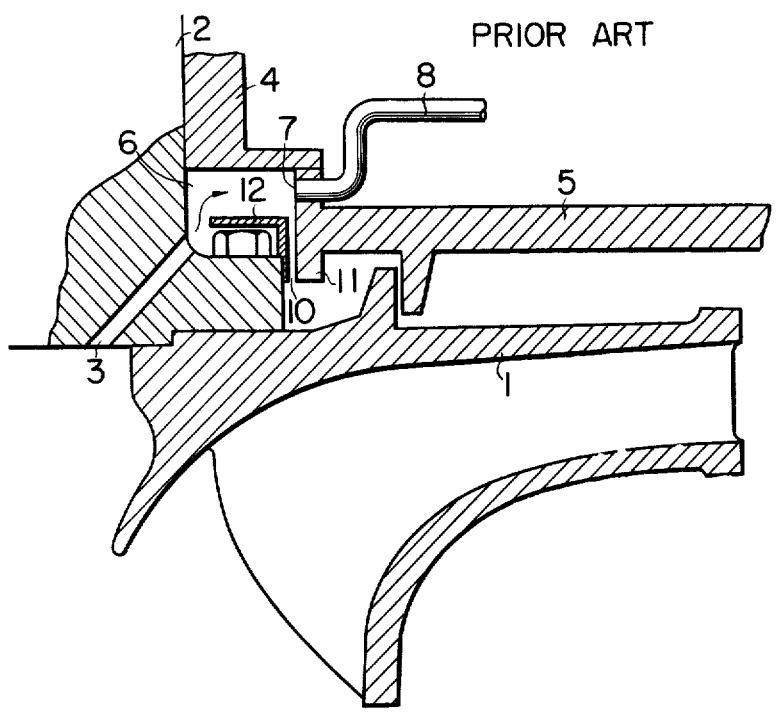
FIG. 1 is a partial sectional view of a prior art water tarbine.
Figure 2:
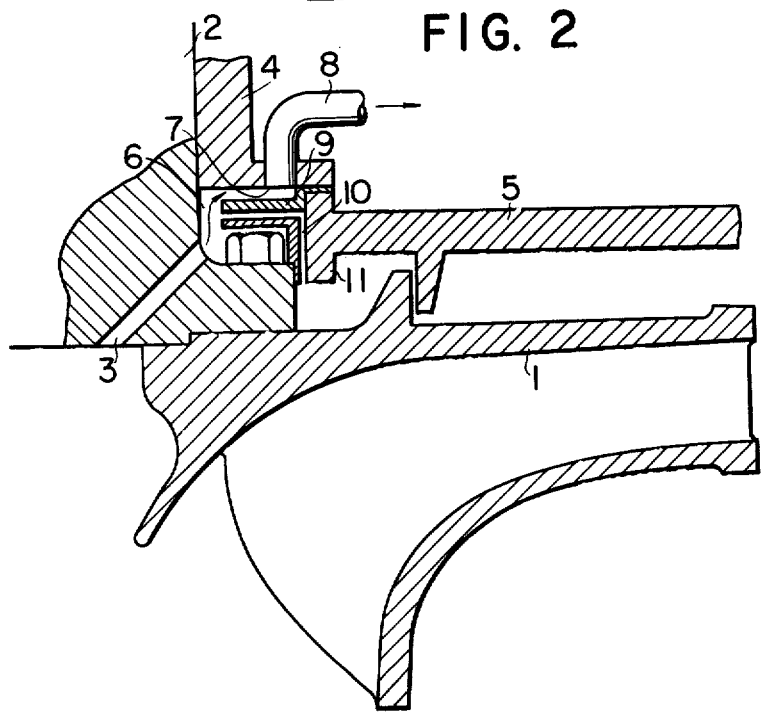
FIG. 2 is a similar view of a water turbine embodying the invention.

In the preferred embodiment of this invention illustrated in FIG. 2, component parts of the water turbine corresponding to those shown in FIG. 1 are designated by the same reference numerals. However, the exit port 7 of the discharge pipe 8 is opened in the upper portion of the annular chamber 6, and a horizontal annular ledge 9 is provided beneath the exit opening 7 for dividing the annular chamber 6 into upper and lower sections.

The outer periphery of the ledge is clamped between the packing gland 4 and the flange 11 of the upper cover 5 and the inner periphery is disposed close to the peripheral surface of shaft 2 with a small gap therebetween for passing the air. With this construction, exit opening 7 and a gap 10 through which the water enters into the annular chamber 6 are isolated by the ledge 9.

To start the turbine as a pump, air under pressure is introduced into the pump chamber by suitable means not shown to force down the water level thus starting the pump at no load. Then the air in the pump chamber is gradually discharged through conduit 3, annular chamber 6 and exhaust pipe 8, thereby gradually filling the pump chamber with water. As described above, the water firstly collected in the peripheral portion of turbine chamber gradually enters into the annular chamber 6 through gap 10. However, the water entered into the lower section of the annular chamber beneath the ledge 9 is rotated by the rotation of the shaft 2 so that the water is pushed toward the outer periphery of the annular chamber thus preventing the water from entering into the same through gap 10. For this reason, the air in the pump chamber can freely flow through conduit 3, through the gap between shaft 2 and the inner periphery of the ledge 9 and through exit opening 7.

In this manner, according to this invention it is possible to efficiently discharge the air contained in the pump chamber without being interferred by the water which leaks into the annular chamber from the peripheral portion of the water turbine when it is switched to act as a pump. Further, as it is possible to form the exit opening at any portion of the annular chamber above the ledge, it is possible to simplify the design and manufacturing of the discharge device. It will be clear that the annular horizontal ledge of this invention can readily be provided for existing installations.

What is claimed is:

1. In a water turbine of the type wherein when the turbine is started to operate as a pump, pressurized air is introduced into the turbine chamber, and then the air therein is discharged through a conduit provided for the shaft of the turbine, through an annular chamber about said shaft and a discharge pipe opening into said annular chamber, the improvement which comprises an annular member for dividing said annular chamber into upper and lower sections, means for securing the outer periphery of said annular member to the outer side wall of said annular chamber, means for connecting said discharge pipe to the upper section, and means for defining a gap between the outer periphery of said shaft and the inner periphery of said annular member for permitting free flow of the air, whereby when said shaft is rotated the water entering into the lower section is forced radially outwardly.

2. The water turbine according to claim 1 wherein said annular chamber is defined between the outer periphery of said shaft, the inner flange of the upper cover of the turbine chamber and the packing gland for said shaft, and said lower section is communicated with the peripheral portion of said turbine chamber.

3. A reversible pump, comprising: a turbine chamber; a turbine shaft mounted for rotation within said chamber; an annular chamber; a conduit connecting said turbine chamber to said annular chamber through said shaft for providing a pressurized air inlet and outlet path between said turbine chamber and said annular chamber; a discharge pipe opening into said annular chamber through which air may be discharged from said annular chamber; and an annular member having an outer peripheral end portion mounted to an outer side wall of said annular chamber and an inner peripheral end portion spaced from the outer periphery of said shaft to define a gap for permitting the free flow of air through said annular chamber between said conduit and said discharge pipe, said annular member dividing said annular chamber into upper and lower sections, whereby water entering the lower section when said shaft is rotating is forced radially outward.

4. A reversible pump according to claim 3, wherein said turbine chamber includes a cover having an inner flange; and further comprising: a packing gland between said shaft and said cover, and means communicating the peripheral portion of said turbine chamber with said annular chamber lower section; said annular chamber being defined between the outer periphery of said shaft, said inner flange and said packing gland.

* * * * *